July 20, 1943.                O. K. BUTZBACH                2,324,819
                            CIRCUIT CONTROLLER
                            Filed June 6, 1941
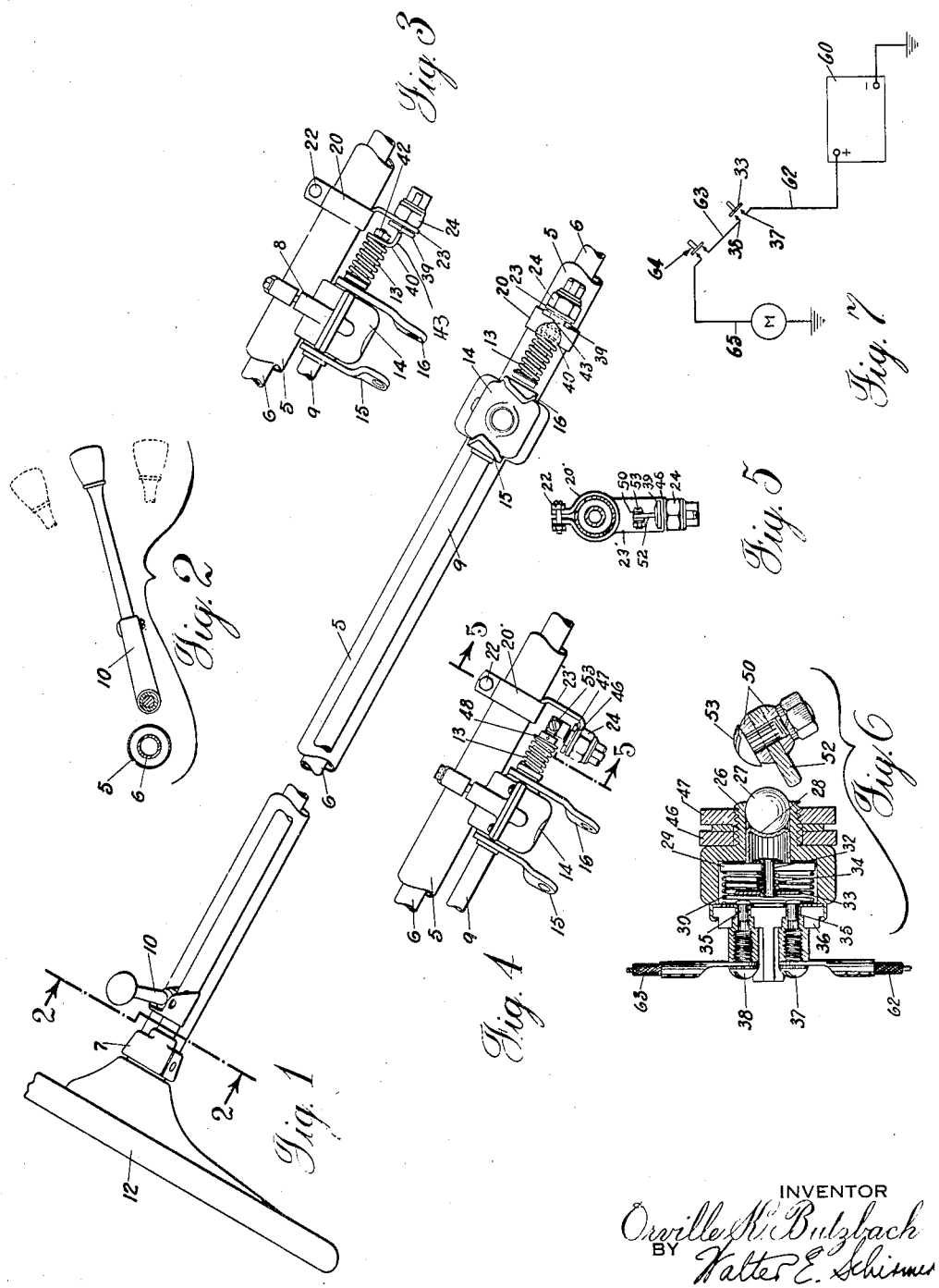
INVENTOR
Orville K. Butzbach
BY Walter E. Schirmer
ATTORNEY Patented July 20, 1943

2,324,819

UNITED STATES PATENT OFFICE 2,324,819

CIRCUIT CONTROLLER

Orville K. Butzbach, South Bend, Ind., assignor to The Studebaker Corporation, South Bend, Ind., a corporation of Delaware Application June 6, 1941, Serial No. 396,909

4 Claims. (Cl. 200—59)

This invention relates to vehicle controls and more particularly is directed to a vehicle control for insuring that the engine of a vehicle will not be started when the transmission thereof is in any of its gear-shifted positions.

With the advent of fluid drive in vehicles it is necessary, if the engine be stopped with the vehicle in gear, to insure that the gears will be returned to neutral position prior to cranking the engine. Without some such protective mechanism it is possible to damage the transmission and render the fluid drive ineffective. Consequently, the present invention has for its primary object to prevent the starting of the vehicle engine unless the gearing has been returned to neutral position.

I have found that the most advantageous way to control the starting of the engine in this manner is to provide means associated with the gear shift control lever requiring that the circuit to the starting motor of the vehicle be arranged so that it cannot be closed when the gear shift control mechanism is in any position other than a neutral position. I preferably accomplish this object by providing the conventional type of manually operated starter push button which I have placed in series with a second switch or control element which can be moved to switch-closing position only when the gear shift lever has been returned to a neutral position.

Inasmuch as practically all manufacturers of automobiles are now adopting the steering column control shift lever which requires a shifting lever below the steering wheel, and includes a control rod mounted on suitable brackets extending parallel to the steering column, I adapt my present invention to provide means located at the bottom of the steering column control rod which will close the secondary switch in the starter motor circuit only when the gear shift lever is moved to its neutral position.

In the preferred form of the invention a suitable bracket mounted at the base of the steering column carries a switch mechanism including a ball or button type actuator projecting from the face thereof. A suitable cam mechanism secured to the lower end of the shift lever control rod is adapted to depress the switch button when the gear shift lever is moved to its neutral position. This closes the circuit through this switch and manual closing of the push button switch then completes the circuit from the battery to the starting motor. Thus, it is apparent that the present system requires that both the manual push button switch and the gear shift controlled switch be closed prior to energization of the starter circuit.

Other objects and advantages of the present invention will appear more fully from the detailed description which, taken in conjunction with the accompanying drawing, will disclose to those skilled in the art the particular construction and operation of the present invention.

In the drawing:

Figure 1 is an elevational view of a steering post and gear shift control mechanism;

Figure 2 is a sectional view taken substantially on line 2—2 of Figure 1;

Figure 3 is a side elevational view of the lower end of the steering column shown in Figure 1;

Figure 4 is a view corresponding to Figure 3 showing a modified type of switch structure;

Figure 5 is a sectional view taken substantially on line 5—5 of Figure 4;

Figure 6 is an enlarged detailed view showing the operation of the actuating cam; and Figure 7 is a diagrammatic view illustrating the control effected by the present invention.

Referring now in detail to the drawing, I have disclosed in Figure 1 the steering column post 5 within which is mounted the steering column shaft 6 for controlling the steering of the vehicle. Mounted by means of suitable brackets 7 and 8 adjacent the upper and lower ends of the steering column there is mounted a shift control rod 9 which is arranged for both rotative and longitudinal movement. Rotative movement is effected by swinging movement of the gear shift lever 10 mounted beneath the steering wheel 12. The various positions of the lever 10 are indicated in Figure 2, the full line showing indicating the neutral position of this lever. The lever 10 is mounted at its inner end in a fixed fulcrum supported from the bracket 7 and a sutiable spring 13 normally urges the rod 9 downwardly to its lowermost position as shown in Figures 1 and 3. The bracket 8 adjacent the lower end of the steering wheel includes a housing portion 14 within which is disposed suitable mechanism engageable by axial shifting movement of the rod 9, and subsequent rotative movement thereof actuates the arms 15 and 16 to control the shifting of the gears in the transmission. These gears have the conventional motion-transmitting rods connected thereto and extending to the shift arms in the transmission. The details of this particular mechanism are disclosed by my Patent No. 2,180,579 and need not be described in detail herein.

Mounted below the bracket 8 on the steering column 5 is a second bracket member 20 which is frictionally engaged about the steering column and held in position by means of the bolt 22. The member 20 is provided with a laterally extending arm portion 23 within which is secured a switch 24, this switch being shown in more detail in Figure 6 and comprising control means arranged in series with the conventional starter button. This switch 24 includes an axially recessed housing having a threaded boss portion 26 within which is disposed a ball member 27 held against moving outwardly of the boss by the spunover end thereof. The ball 27 is adapted to bear against the plunger member 28 which is connected to a spring washer 29 normally urged toward the boss end of the housing 24 by means of a spring 30. Mounted in the spring washer 29 is a sleeve member 32 which, at its lower end, carries a contact disk 33 normally spring-pressed into position by means of a small spring 34. When the ball 27 is pushed inwardly of the boss 26 the plunger 28 is depressed, thereby moving the contact disk 33 toward the open end of the housing 24 and into engagement with the contacts 35 carried by an insulated closure member 36. The contacts 35, when engaged by the disk 33, close a circuit between terminals 37 and 38.

The switch 24 is secured in position by receiving the bracket 23 about the boss portion thereof, the bracket being clamped in position by means of a threaded nut 39 threaded over the boss and clamping the switch rigidly in position. At the lower end of the rod 9 there is provided a cam member 40 which is rotatively secured to the lower end of the rod 9 and clamped in position by means of a nut 42 threaded over the end of the rod. The cam 40 has a normally directed portion provided with an ear 43 which, when the gear shift lever 10 is in the position shown in full lines in Figure 2, is disposed in engagement with the ball 27, depressing the same to close the switch. When rotated into either of its opposite positions, the ear 43 moves away from the ball 27 and the spring 30 then produces opening of the switch.

It will also be apparent that as the gear shift lever 10 is raised as occurs, for example, when it is attempted to shift into first or reverse gearing, the rod 9 will be correspondingly raised and will move the ear 43 away from the ball 27. Consequently, the ball 27 is depressed and the switch 24 closed only when the gear shift lever 10 is in its normal neutral position.

In Figures 4 and 5 I have shown a slight modification of the construction described in Figures 1 and 3. In this form of the invention the bracket 20' is provided with the laterally directed portion 23' which terminates in a normally directed apertured flange 46 which flange is adapted to receive the boss portions 26 of the switch 24, the switch being clamped in position by means of the nut 47 threaded over the boss portion to clamp the switch to the bracket. The lower end of the rod 9 in this form of the invention carries the spring 13 as previously described, this spring, however, now seating against the spring washer 48 adjacent the lower end of the rod 9. The rod 9 is provided with a bifurcated end indicated at 50 between which is inserted the cam member 52 held in place by means of the screw 53. Upon rotation of the shaft 9 it will be apparent that the cam 52 will move in an arc, the end thereof moving into the path of the ball 27 of the switch 24 when the gear shift lever is placed in neutral position. This depresses the ball 27 to close the switch, as clearly shown in Figure 5.

Considering now the circuit controlled by the switch 24, I have shown in Figure 7 a diagrammatic illustration in which the battery 60 is shown as having the positive terminal thereof connected through the conductor 62 to one terminal 37 of the switch 24. The opposite terminal 38 of this switch is connected through a conductor 63 to one terminal of the conventional push button starter switch indicated generally at 64. From this switch current is carried through the conductor 65 in any desired manner to the starting motor. It will be apparent that with this construction the contact disk 33 must be placed against the contacts leading to the terminals 37 and 38 before closing of the push button switch 64 to complete the circuit from the battery to the starting motor. With the secondary switch in series with the starting switch and controlled by oscillation by the gear shift lever, it is apparent that the starting circuit cannot be closed unless the manual push button switch is actuated and in addition the gear shift lever is returned to its normal neutral position. This positively precludes the possibility of starting the vehicle in gear.

I am aware that changes may be made in certain details of the present construction without in any way departing from the underlying principles thereof. I therefore do not intend to be limited except as defined by the scope and spirit of the appended claims.

I claim:

1. In a vehicle having a steering column, the combination of a gear shift control rod supported in a position parallelling said column, a shift lever at one end of said rod, a switch supported adjacent the opposite end of said rod, and cam means carried on said opposite end of said rod, said lever being actuatable for imparting rotational and longitudinal shifting movement of said rod to a plurality of gear selective positions and a neutral position, said cam being arranged relative to said switch so that in said gear selective positions said cam is out of engagement with said switch and in said neutral position said cam is in engagement with said switch to close the latter.

2. The combination of claim 1 wherein said switch is held in position by a bracket secured to said column.

3. The combination of claim 1 wherein said switch is laterally offset from the axis of said rod and has a ball actuator, and said cam means comprises a laterally projecting plate arcuately movable upon rotation of said rod for depressing said ball only when said rod is disposed in neutral position.

4. The combination of claim 1 wherein said rod is spring-loaded for urging said cam into engagement with said switch when said rod is disposed in its neutral position.

ORVILLE K. BUTZBACH.